United States Patent
Yang et al.

(10) Patent No.: US 12,386,427 B2
(45) Date of Patent: Aug. 12, 2025

(54) EARPHONE, EARPHONE CONTROL METHOD AND EARPHONE CONTROL DEVICE

(71) Applicant: GOERTEK INC., Shandong (CN)

(72) Inventors: Pei Yang, Shandong (CN); Hao Yun, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 17/789,919

(22) PCT Filed: Jun. 28, 2021

(86) PCT No.: PCT/CN2021/102837
§ 371 (c)(1),
(2) Date: Jun. 29, 2022

(87) PCT Pub. No.: WO2022/183641
PCT Pub. Date: Sep. 9, 2022

(65) Prior Publication Data
US 2023/0376118 A1    Nov. 23, 2023

(30) Foreign Application Priority Data
Mar. 4, 2021   (CN) .......................... 202110239415.4

(51) Int. Cl.
G06F 3/01    (2006.01)
G01S 7/539   (2006.01)
(Continued)

(52) U.S. Cl.
CPC .............. G06F 3/017 (2013.01); G01S 7/539 (2013.01); G06F 3/165 (2013.01); H04R 1/1041 (2013.01);
(Continued)

(58) Field of Classification Search
CPC .......... G06F 3/017; G06F 3/165; G01S 7/539; H04R 1/1041; H04R 1/1075; H04R 5/033; H04R 2420/07
See application file for complete search history.

(56) References Cited

U.S. PATENT DOCUMENTS 9,377,860 B1 *   6/2016  Weber ..................... G06F 3/017
2013/0229508 A1 * 9/2013 Li ............................ G06F 1/3287
                                                            348/77
(Continued)

FOREIGN PATENT DOCUMENTS

CN    104410938    3/2015
CN    105242786    1/2016
(Continued)

OTHER PUBLICATIONS

Chinese First Office Action for Chinese Application No. 202110239415.4, dated Jun. 2, 2022, 16 pages with translation.
(Continued)

*Primary Examiner* — Daniel R Sellers
(74) *Attorney, Agent, or Firm* — HAUPTMAN HAM, LLP

(57) ABSTRACT

An earphone, an earphone control method and an earphone control device are provided. The earphone control method and the earphone control device are applied to an earphone arranged with an ultrasonic transceiver and an ultrasonic receiver. The method includes: controlling the ultrasonic transceiver to transmit a first ultrasonic signal while the earphone is being worn (S110); obtaining a first echo signal collected by the ultrasonic transceiver, determining whether there is an object within a preset range based on the first echo signal, and controlling, in a case that there is an object within the preset range (S120), the ultrasonic transceiver to transmit a second ultrasonic signal (S130); performing feature extraction and gesture identification based on a second echo signal
(Continued)

collected by the ultrasonic transceiver and a third echo signal collected by the ultrasonic receiver to obtain an identification result (S140); and determining whether the identification result indicates a valid gesture based on a current operation mode of the earphone and preset gestures corresponding to the current operation mode, and controlling, in a case that the identification result indicates the valid gesture (S150), the earphone to perform an action based on an action instruction corresponding to the valid gesture (S160). According to the present disclosure, the earphone is controlled, improving the control sensitivity of the earphone and the user experience, and facilitating miniaturization of earphones.

9 Claims, 2 Drawing Sheets

(51) Int. Cl.
 G06F 3/16 (2006.01)
 H04R 1/10 (2006.01)
 H04R 5/033 (2006.01)
(52) U.S. Cl.
 CPC ........... *H04R 1/1075* (2013.01); *H04R 5/033* (2013.01); *H04R 2420/07* (2013.01)

(56) References Cited

U.S. PATENT DOCUMENTS

| | | | | |
|---|---|---|---|---|
| 2017/0064432 A1* | 3/2017 | Hviid | ...................... | G01J 1/16 |
| 2017/0068437 A1* | 3/2017 | Warren | ................ | G05B 19/048 |
| 2017/0280223 A1* | 9/2017 | Cavarra | ................ | G06F 1/1694 |
| 2018/0227658 A1* | 8/2018 | Hviid | ................... | H04R 1/1083 |
| 2019/0384407 A1* | 12/2019 | Smith | .................... | G06V 40/11 |
| 2020/0160038 A1 | 5/2020 | Gong et al. | | |

FOREIGN PATENT DOCUMENTS

| | | |
|---|---|---|
| CN | 105242861 | 1/2016 |
| CN | 105824406 | 8/2016 |
| CN | 107708007 | 2/2018 |
| CN | 107920312 | 4/2018 |
| CN | 108255531 | 7/2018 |
| CN | 109491552 | 3/2019 |
| CN | 109857245 | 6/2019 |
| CN | 110505549 | 11/2019 |
| CN | 110632853 | 12/2019 |
| CN | 111722715 | 9/2020 |
| CN | 111736688 | 10/2020 |
| CN | 112987925 | 6/2021 |

OTHER PUBLICATIONS

International Search Report for International Application No. PCT/CN2021/102837, 6 pages.

* cited by examiner

EARPHONE, EARPHONE CONTROL METHOD AND EARPHONE CONTROL DEVICE

This application is a 371 of International Patent Application No. PCT/CN2021/102837, titled "EARPHONE, EARPHONE CONTROL METHOD AND EARPHONE CONTROL DEVICE", filed on Jun. 28, 2021, which claims the benefit of and priority to Chinese Patent Application No. 202110239415.4, titled as "EARPHONE, EARPHONE CONTROL METHOD AND EARPHONE CONTROL DEVICE", filed on Mar. 4, 2021 with the Chinese Patent Office, which are incorporated herein by reference in their entireties.

FIELD

The embodiments of the present disclosure relate to the technical field of earphones, and in particular to an earphone, an earphone control method and an earphone control device.

BACKGROUND

With the rapid development of artificial intelligence technology in recent years, intelligent wearable products have been developed unprecedentedly, achieving diversified products and more and more functions. TWS (True Wireless Stereo) Bluetooth earphones are developed rapidly, with exponential growth in shipments and good development prospects. The TWS technology is performed based on the development of chip technology. According to the TWS technology, a mobile phone is connected to a master earphone and then is wirelessly connected a slave earphone via the master earphone by using the Bluetooth technology, realizing wireless separation use of left and right channels based on the Bluetooth technology.

At present, the TWS earphones have the music playback control functions of playing music, pausing playback, playing a previous piece of music, playing a next piece of music, increasing volume, and decreasing volume. These functions are usually performed in an infrared IR manner or a capacitive touch manner. However, for the infrared IR manner, power consumption is large, it is required to open a hole, and it is easily affected by light in performing functions. For the capacitive touch manner, it is required to reserve a plane space on the outside of the earphones, which limits the miniaturization of the earphones. In addition, in the capacitive touch manner, the identification sensitivity is to be reduced due to the influence of external environmental factors such as dust and sweat.

In view of this, how to provide an earphone, an earphone control method and an earphone control device to solve the above technical problems is a technical problem to be solved by those skilled in the art.

SUMMARY

According to the embodiments of the present disclosure, an earphone, an earphone control method and an earphone control device are provided, improving the control sensitivity of the earphone in using, improving the user experience, and facilitating miniaturization of earphones.

To solve the above technical problems, an earphone control method is provided according to an embodiment of the present disclosure. The method is applied to an earphone arranged with an ultrasonic transceiver and an ultrasonic receiver. The method includes: controlling the ultrasonic transceiver to transmit a first ultrasonic signal while the earphone is being worn; obtaining a first echo signal collected by the ultrasonic transceiver, determining whether there is an object within a preset range based on the first echo signal, and controlling, in a case that there is an object within the preset range, the ultrasonic transceiver to transmit a second ultrasonic signal; performing feature extraction and gesture identification based on a second echo signal collected by the ultrasonic transceiver and a third echo signal collected by the ultrasonic receiver to obtain an identification result; and determining whether the identification result indicates a valid gesture based on a current operation mode of the earphone and preset gestures corresponding to the current operation mode, and controlling, in a case that the identification result indicates the valid gesture, the earphone to perform an action based on an action instruction corresponding to the valid gesture.

In an embodiment, the determining whether the identification result indicates a valid gesture based on a current operation mode of the earphone and preset gestures corresponding to the current operation mode includes: obtaining, based on the current operation mode of the earphone, the preset gestures corresponding to the current operation mode; and performing match processing on the identification result and the preset gestures, and determining that the identification result indicates the valid gesture in a case that there is a preset gesture matching the identification result.

In an embodiment, in a case that the current operation mode is a music playing mode, preset gestures corresponding to the music playing mode include: a slide-up gesture, a slide-down gesture, a slide-left gesture and a slide-right gesture. The slide-left gesture is a gesture sliding along a direction a human face is facing in a horizontal direction. The slide-right gesture is a gesture sliding along a direction opposite to the direction the human face is facing in the horizontal direction. The slide-up gesture is a gesture sliding in a vertical direction away from a ground. The slide-down gesture is a gesture sliding in the vertical direction towards the ground.

In an embodiment, an action instruction corresponding to the slide-up gesture is an instruction of playing a previous piece of music, an action instruction corresponding to the slide-down gesture is an instruction of playing a next piece of music, an action instruction corresponding to the slide-left gesture is an instruction of increasing volume, and an action instruction corresponding to the slide-right gesture is an instruction of decreasing volume.

In an embodiment, the preset gestures corresponding to the music playing mode further include a slap gesture. The slap gesture is a gesture vertically approaching the earphone in the horizontal direction. The controlling the earphone to perform an action based on an action instruction corresponding to the valid gesture includes: obtaining a current operation state of the earphone, and determining an action instruction corresponding to the slap gesture based on the current operation state; and controlling the earphone to perform the action based on the action instruction.

In an embodiment, in a case that the operation state is a music playing state, the action instruction corresponding to the slap gesture is an instruction of pausing playback; and in a case that the operation state is a playback pause state, the action instruction corresponding to the slap gesture is an instruction of resuming playback.

In an embodiment, in a case that the current operation mode is a call mode, preset gestures corresponding to the call mode include a slap gesture. The controlling the earphone to perform an action based on an action instruction corresponding to the valid gesture includes: in a case that a current operation state of the earphone is a call state, determining that an action instruction corresponding to the slap gesture is an instruction of hanging up based on the call state, and controlling the earphone to end an call based on the instruction of hanging up; and in a case that a current operation state of the earphone is an incoming call state, determining that an action instruction corresponding to the slap gesture is an instruction of answering, and controlling the earphone to enter into a call state based on the instruction of answering.

According to an embodiment of the present disclosure, an earphone control device is further provided. The device is applied to an earphone arranged with an ultrasonic transceiver and an ultrasonic receiver. The device includes: a transceiver module, an obtaining module, a first determination module, an identification module, a second determination module, and an execution module. The transceiver module is configured to control the ultrasonic transceiver to transmit a first ultrasonic signal while the earphone is being worn, and to control the ultrasonic transceiver to transmit a second ultrasonic signal. The obtaining module is configured to obtain a first echo signal collected by the ultrasonic transceiver. The first determination module is configured to determine whether there is an object within a preset range based on the first echo signal, and to trigger the transceiver module in a case that there is an object within the preset range. The identification module is configured to perform feature extraction and gesture identification based on a second echo signal collected by the ultrasonic transceiver and a third echo signal collected by the ultrasonic receiver to obtain an identification result. The second determination module is configured to determine whether the identification result indicates a valid gesture based on a current operation mode of the earphone and preset gestures corresponding to the current operation mode, and to trigger the execution module in case that the identification result indicates the valid gesture. The execution module is configured to control the earphone to perform an action based on an action instruction corresponding to the valid gesture.

According to an embodiment of the present disclosure, an earphone is further provided. The earphone includes an ultrasonic transceiver, an ultrasonic receiver, a memory and a processor. The ultrasonic transceiver is configured to transmit a first ultrasonic signal and a second ultrasonic signal, and to receive a first echo signal and a second echo signal. The ultrasonic receiver is configured to receive a third echo signal. The memory stores a computer program. The processor is configured to perform, when executing the computer program, the earphone control method described above.

In an embodiment, the earphone is a TWS earphone. A secondary microphone arranged in the earphone has an ultrasonic reception function, and the secondary microphone is configured to serve as the ultrasonic receiver.

An earphone, an earphone control method and an earphone control device are provided according to the embodiments of the present disclosure. The method is applies to an earphone arranged with an ultrasonic transceiver and an ultrasonic receiver. The ultrasonic transceiver is controlled to transmit a first ultrasonic signal while the earphone is being worn. It is determined whether there is an object within a preset range based on a first echo signal collected by the ultrasonic transceiver. In a case that there is an object within the preset range, the ultrasonic transceiver is controlled to transmit a second ultrasonic signal. Feature extraction and gesture identification are performed based on a second echo signal collected by the ultrasonic transceiver and a third echo signal collected by the ultrasonic receiver to obtain an identification result. Match processing is performed on the identification result and the preset gestures corresponding to a current operation mode to determine whether an identified gesture is a valid gesture. In a case that the identified gesture is the valid gesture, the earphone is controlled to perform an action based on an action instruction corresponding to the valid gesture. The ultrasonic transceiver and the ultrasonic receiver adopted in the present disclosure have the advantageous of low power consumption, small device size and low cost. According to the present disclosure, the earphone can be controlled based on gesture identification processing, improving control sensitivity of the earphone and the user experience, and facilitating miniaturization of earphones.

BRIEF DESCRIPTION OF THE DRAWINGS

In order to more clearly describe the technical solutions according to the embodiments of the present disclosure, the drawings to be used in the embodiments of the present disclosure or the conventional technology are briefly described hereinafter. It is apparent that the drawings described below show merely some embodiments of the present disclosure, and those skilled in the art may obtain other drawings from the provided drawings without any creative effort.

DETAILED DESCRIPTION OF EMBODIMENTS

According to the embodiments of the present disclosure, an earphone, an earphone control method and an earphone control device are provided, improving the control sensitivity of the earphone in using, improving the user experience, and facilitating miniaturization of earphones.

In order to make the objective, technical solutions and advantages of the embodiments of the present disclosure clearer, the technical solutions in the embodiments of the present disclosure are described clearly and completely in conjunction with the drawings of the embodiments of the disclosure hereinafter. It is apparent that the described embodiments are only some rather than all embodiments of the present disclosure. Based on the embodiments of the present disclosure, all other embodiments obtained by those ordinarily skilled in the art without any creative efforts fall within the protection scope of the present disclosure.

Figure 1:
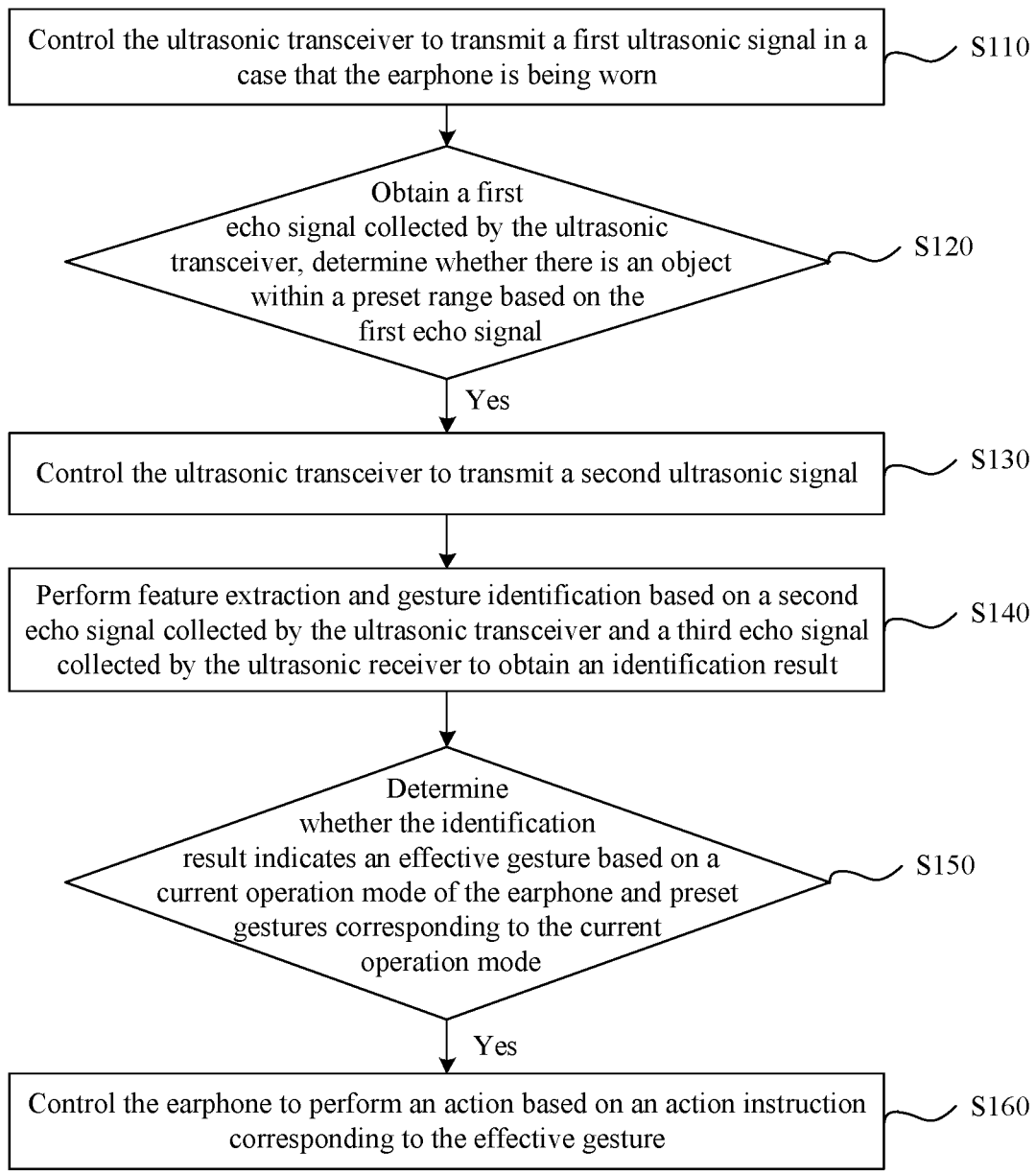
FIG. 1 is a flow chart of an earphone control method according to an embodiment of the present disclosure.

Reference is made to FIG. 1, which is a flow chart of an earphone control method according to an embodiment of the present disclosure. The method is applied to an earphone arranged with an ultrasonic transceiver and an ultrasonic receiver. The method includes the following steps S110 to S160.

In step S110, the ultrasonic transceiver is controlled to transmit a first ultrasonic signal while the earphone is being worn.

It should be noted that in a case that it is detected that the earphone is being worn, the ultrasonic transceiver may be controlled to transmit a first ultrasonic signal. Specifically, the ultrasonic transceiver may be controlled to transmit the first ultrasonic signal with a time interval T1.

In step S120, a first echo signal collected by the ultrasonic transceiver is obtained, and it is determined whether there is an object within a preset range based on the first echo signal. In a case that there is an object within the preset range, proceed to S130.

Specifically, after transmitting the first ultrasonic signal, the ultrasonic transceiver may receive a first echo signal and then analyzes the first echo signal to determine whether there is an object within a preset range. Specifically, the ultrasonic transceiver may determine a distance from the object to the ultrasonic transceiver based on the energy of the first echo signal, and then determines whether the object is within the preset range.

In step S130, the ultrasonic transceiver is controlled to transmit a second ultrasonic signal.

Specifically, in a case that it is determined that the object is within the preset range, the ultrasonic transceiver is controlled to transmit the second ultrasonic signal (that is, the ultrasonic transceiver stops transmitting the first ultrasonic signal and starts transmitting the second ultrasonic signal). Specifically, the ultrasonic transceiver may be controlled to transmit the second ultrasonic signal with a time interval T2. T1 is greater than T2, for example, T1 is equal to 1 s, and T2 is equal to 50 sm. Thus, the power consumption of the earphone may be reduced in a case that no object is within the preset range. In addition, the waveforms and the magnitudes of the first ultrasonic signal and the second ultrasonic signal may be different, which may be determined according to actual requirements and are not limited in the embodiments of the present disclosure.

In step S140, features extraction and gesture identification are performed based on a second echo signal collected by the ultrasonic transceiver and a third echo signal collected by the ultrasonic receiver to obtain an identification result.

It should be noted that after the ultrasonic transceiver transmits the second ultrasonic signal, the second ultrasonic signal is reflected back on encountering an object, then the ultrasonic transceiver receives a second echo signal. The ultrasonic receiver receives a third echo signal. Then, a motion of the object may be identified in two dimensions based on the second echo signal and the third echo signal. Specifically, corresponding features may be extracted to perform gesture identification to obtain an identification result. The identification result includes gesture information.

In step S150, it is determined whether the identification result indicates a valid gesture based on a current operation mode of the earphone and preset gestures corresponding to the current operation mode. In a case that the identification result indicates a valid gesture, proceed to S160.

It should be noted that multiple gestures may be preset based on the operation modes of the earphone, and corresponding relationships between the preset gestures and action instructions are established. Based on the preset gestures and the corresponding relationships, the identification result is obtained. Based on the current operation mode of the earphone, the preset gestures corresponding to the operation mode may be determined. Then, match processing is performed on the identification result and the preset gestures to determine whether the gesture corresponding to the identification result is a valid gesture, that is, to determine whether there is a preset gesture consistent with the gesture indicated by the recognition result. In a case that there is a preset gesture consistent with the gesture indicated by the recognition result, the identification result indicates a valid gesture; and in a case that there is no preset gesture consistent with the gesture indicated by the recognition result, no effective gesture is identified.

In step S160, the earphone is controlled to perform an action based on an action instruction corresponding to the valid gesture.

Specifically, in a case that a valid gesture is identified, the earphone may be controlled to perform an action based on an action instruction of a preset gesture corresponding to the identification result, thereby performing gesture identification by using ultrasonic waves and then controlling the earphone based on gestures.

Further, the process of determining whether the identification result indicates a valid gesture based on a current operation mode of the earphone and preset gestures corresponding to the current operation mode in step S150 may include: obtaining, based on the current operation mode of the earphone, the preset gestures corresponding to the current operation mode; and performing match processing on the identification result and the preset gestures, and determining that the identification result indicates the valid gesture in a case that there is a preset gesture matching the identification result.

Specifically, for each of the operation modes of the earphone, multiple gestures may be preset based on the operation mode. Then, based on the current operation mode of the earphone, the preset gestures corresponding to the current operation mode are determined. Match processing is performed on the identification result and the preset gestures. In a case that a preset gesture matching the identification result is identified, it indicates that the identification result indicates a valid gesture. In a case that no preset gesture matching the identification result is identified, it indicates that the identification result indicates an invalid gesture.

In addition, it should be further noted that after the process of determining whether the identification result indicates a valid gesture based on a current operation mode of the earphone and preset gestures corresponding to the current operation mode in step S150, in a case that it is determined based on the identification result that no valid gesture is identified for a first preset time period, the ultrasonic transceiver is controlled to stop transmitting the second ultrasonic signal and start transmitting the first ultrasonic signal. That is, in the case that no valid gesture is detected for the first preset time period, it indicates that the user has not make any gesture to control the earphone. Then, the current identification process ends, and a next identification process may be started. That is, the ultrasonic transceiver may be controlled to stop transmitting the second ultrasonic signal and start transmitting the first ultrasonic signal to enter the next identification process.

Further, in a case that the current operation mode is a music playing mode, preset gestures corresponding to the music playing mode may include: a slide-up gesture, a slide-down gesture, a slide-left gesture and a slide-right gesture. The slide-left gesture is a gesture sliding along a direction a human face is facing in a horizontal direction. The slide-right gesture is a gesture sliding along a direction opposite to the direction the human face is facing in the horizontal direction. The slide-up gesture is a gesture sliding in a vertical direction away from a ground. The slide-down gesture is a gesture sliding in the vertical direction towards the ground.

The action instruction corresponding to the slide-up gesture is an instruction of playing a previous piece of music, the action instruction corresponding to the slide-down gesture is an instruction of playing a next piece of music, the action instruction corresponding to the slide-left gesture is an instruction of increasing volume, and the action instruction corresponding to the slide-right gesture is an instruction of decreasing volume.

Specifically, in a case that the earphone is in the music play mode, actions such as adjusting volume, playing a previous piece of music, and playing a next piece of music are usually performed. Therefore, four gestures are preset for the music playing mode in an embodiment of the present disclosure. The four gestures include the slide-up gesture, the slide-down gesture, the slide-left gesture and the slide-right gesture. The action instructions corresponding to the four gestures are the instruction of playing a previous piece of music, the instruction of playing a next piece of music, the instruction of increasing volume and the instruction of decreasing volume, respectively.

In addition, the user may need to pause or play the music in practical applications. In an embodiment of the present disclosure, the preset gestures corresponding to the music playing mode may further include a slap gesture. The slap gesture is a gesture vertically approaching the earphone in the horizontal direction. The process of controlling the earphone to perform an action based on an action instruction corresponding to the valid gesture includes: obtaining a current operation state of the earphone, and determining an action instruction corresponding to the slap gesture based on the current operation state; and controlling the earphone to perform the action based on the action instruction.

Specifically, in practical applications, in a case that the operation state is a music playing state, the action instruction corresponding to the slap gesture is an instruction of pausing playback; and in a case that the operation state is a playback pause state, the action instruction corresponding to the slap gesture is an instruction of resuming playback.

That is, after it is determined the preset gesture matching the identification result is a slap gesture, an current operation state of the earphone may be obtained. In a case that the operation state is the music playing state, an pausing playback operation is performed on the music based on the slap gesture, so that the action instruction corresponding to the slap gesture is an instruction of pausing playback. In a case that the operation state is a playback pause state, an resuming playback operation is performed on the music based on the slap gesture, so that the action instruction corresponding to the slap gesture is an instruction of resuming playback.

Further, in a case that the current operation mode is a call mode, preset gestures corresponding to the call mode include a slap gesture. The process of controlling the earphone to perform an action based on an action instruction corresponding to the valid gesture includes: in a case that a current operation state of the earphone is a call state, determining that an action instruction corresponding to the slap gesture is an instruction of hanging up based on the call state, and controlling the earphone to end an call based on the instruction of hanging up; and in a case that a current operation state of the earphone is an incoming call state, determining that an action instruction corresponding to the slap gesture is an instruction of answering, and controlling the earphone to enter into a call state based on the instruction of answering.

It should be further noted that, in a case that the current operation mode of the earphone is the call mode, the preset gestures corresponding to the call mode include the slap gesture. After the identification result is obtained, determination processing is performed on the identification result based on the preset gestures corresponding to the call mode. In a case that the identification result is consistent with one of the preset gestures, the current operation state of the earphone in the call mode is further determined. In a case that the current operation state is the call state, the user inputs the slap gesture to end the call, that is, to perform a hang up operation, so that the action instruction corresponding to the slap gesture is the instruction of hanging up, and the earphone is controlled to end the call based on the instruction of hanging up. In a case that the current operation state is the incoming call state, the user inputs the slap gesture to answer the call, so that the action instruction corresponding to the slap gesture is the instruction of answering, and the earphone is controlled to enter into a call state based on the instruction of answering.

In addition, in a case that the earphone is a TWS earphone, since a secondary microphone of the earphone is used for collecting environment sounds, the secondary microphone of the earphone may be configured as a MIC having an ultrasonic reception function. The secondary microphone serves as the ultrasonic receiver, thereby facilitating the miniaturization of the earphone.

It can be seen that, in the embodiments of the present disclosure, the ultrasonic transceiver is controlled to transmit a first ultrasonic signal while the earphone is being worn. It is determined whether there is an object within a preset range based on a first echo signal collected by the ultrasonic transceiver. In a case that there is an object within the preset range, the ultrasonic transceiver is controlled to transmit a second ultrasonic signal. Feature extraction and gesture identification are performed based on a second echo signal collected by the ultrasonic transceiver and a third echo signal collected by the ultrasonic receiver to obtain an identification result. Match processing is performed on the identification result and the preset gestures corresponding to a current operation mode to determine whether an identified gesture is a valid gesture. In a case that the identified gesture is the valid gesture, the earphone is controlled to perform an action based on an action instruction corresponding to the valid gesture. The ultrasonic transceiver and the ultrasonic receiver adopted in the present disclosure have the advantageous of low power consumption, small device size and low cost. According to the present disclosure, the earphone can be controlled based on gesture identification processing, improving control sensitivity of the earphone and the user experience, and facilitating miniaturization of earphones.

Figure 2:
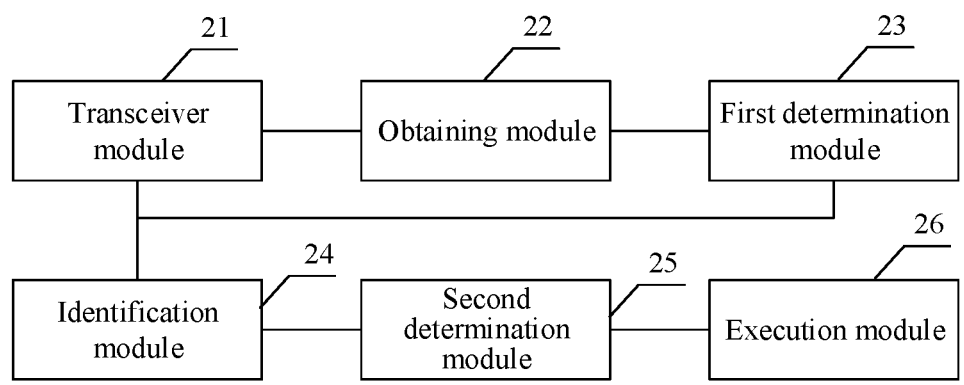
FIG. 2 is a schematic structural diagram of an earphone control device according to an embodiment of the present disclosure.

Based on the above embodiments, an earphone control device is further provided according to an embodiment of the present disclosure. The earphone control device is applied to an earphone arranged with an ultrasonic transceiver and an ultrasonic receiver. As shown in FIG. 2, the device includes a transceiver module 21, an obtaining module 22, a first determination module 23, an identification module 24, a second determination module 25, and an execution module 26.

The transceiver module 21 is configured to control the ultrasonic transceiver to transmit a first ultrasonic signal while the earphone is being worn, and to control the ultrasonic transceiver to transmit a second ultrasonic signal.

The obtaining module 22 is configured to obtain a first echo signal collected by the ultrasonic transceiver.

The first determination module 23 is configured to determine whether there is an object within a preset range based on the first echo signal, and to trigger the transceiver module 21 in a case that there is an object within the preset range.

The identification module 24 is configured to perform feature extraction and gesture identification based on a second echo signal collected by the ultrasonic transceiver and a third echo signal collected by the ultrasonic receiver to obtain an identification result.

The second determination module 25 is configured to determine whether the identification result indicates a valid gesture based on a current operation mode of the earphone and preset gestures corresponding to the current operation mod, and to trigger the execution module 26 in case that the identification result indicates the valid gesture.

The execution module 26 is configured to control the earphone to perform an action based on an action instruction corresponding to the valid gesture.

It should be noted that the earphone control device in the embodiments of the present disclosure has the same beneficial effects as the earphone control method in the above embodiments. For the detail descriptions of the earphone control method involved in the device embodiments, one may refer to the above method embodiments, which are not repeated herein.

Based on the above embodiments, an earphone is provided according to an embodiment of the present disclosure. The earphone includes an ultrasonic transceiver, an ultrasonic receiver, a memory and a processor.

The ultrasonic transceiver is configured to transmit a first ultrasonic signal and a second ultrasonic signal, and to receive a first echo signal and a second echo signal.

The ultrasonic receiver is configured to receive a third echo signal.

The memory stores a computer programs.

The processor is configured to perform, when executing the computer program, the earphone control method described above.

In a case that the earphone is a TWS earphone, since a secondary microphone of the earphone is used for collecting environment sounds, the secondary microphone of the earphone may be configured as a MIC having an ultrasonic reception function. The secondary microphone serves as the ultrasonic receiver, thereby facilitating the miniaturization of the earphone.

For example, the processor according to the embodiments of the present disclosure may be configured to: control the ultrasonic transceiver to transmit a first ultrasonic signal while the earphone is being worn; obtain a first echo signal collected by the ultrasonic transceiver, determine whether there is an object within a preset range based on the first echo signal, and control, in a case that there is an object within the preset range, the ultrasonic transceiver to transmit a second ultrasonic signal; perform feature extraction and gesture identification based on a second echo signal collected by the ultrasonic transceiver and a third echo signal collected by the ultrasonic receiver to obtain an identification result; and determine whether the identification result indicates a valid gesture based on a current operation mode of the earphone and preset gestures corresponding to the current operation mode, and control, in a case that the identification result indicates the valid gesture, the earphone to perform an action based on an action instruction corresponding to the valid gesture.

The embodiments in this specification are described in a progressive way, each of which emphasizes the differences from others, and for the same or similar parts among the embodiments can be referred to each other. Since the device disclosed in the embodiments corresponds to the method therein, the description thereof is relatively simple, and for relevant matters, one may refer to the description of the method.

It should be noted that in the present disclosure, the relationship terms such as "first" and "second" are merely used for distinguishing one entity or operation from another, rather than indicating or implying that the actual relationship or order exists between these entities or operations. In addition, in this specification, terms of "include", "comprise" or any other variants are intended to be non-exclusive. Therefore, a process, a method, an article or a device including multiple elements includes not only the elements but also other elements that are not enumerated, or also includes the elements inherent in the process, method, article or device. Unless expressively limited otherwise, the statement "comprising (including) one . . . " does not exclude the case that other similar elements may exist in the process, method, article or device.

The above illustration of the disclosed embodiments enables those skilled in the art to implement or practice the present disclosure. Many changes to these embodiments are apparent for those skilled in the art, and general principles defined herein can be implemented in other embodiments without departing the spirit or scope of the present disclosure. Hence, the present disclosure is not limited to the embodiments disclosed herein, but is to conform to the widest scope consistent with principles and novel features disclosed herein.

The invention claimed is:

1. An earphone control method, applied to an earphone arranged with an ultrasonic transceiver and an ultrasonic receiver, comprising:
   controlling the ultrasonic transceiver to transmit a first ultrasonic signal while the earphone is being worn;
   obtaining a first echo signal collected by the ultrasonic transceiver, determining whether an object is within a preset range based on the first echo signal, and controlling, in response to the object being within the preset range, the ultrasonic transceiver to transmit a second ultrasonic signal;
   performing feature extraction and gesture identification based on a second echo signal collected by the ultrasonic transceiver and a third echo signal collected by the ultrasonic receiver to obtain an identification result; and
   determining whether the identification result indicates a valid gesture based on a current operation mode of the earphone and preset gestures corresponding to the current operation mode, and controlling, in response to the identification result indicating the valid gesture, the earphone to perform an action based on an action instruction corresponding to the valid gesture;
   wherein the first ultrasonic signal is transmitted in a time interval T1, the second ultrasonic signal is transmitted in a time interval T2, and T1 is greater than T2.

2. The earphone control method according to claim 1, wherein the determining whether the identification result indicates the valid gesture based on the current operation mode of the earphone and the preset gestures corresponding to the current operation mode comprises:
   obtaining, based on the current operation mode of the earphone, the preset gestures corresponding to the current operation mode; and
   performing match processing on the identification result and the preset gestures, and determining that the identification result indicates the valid gesture in response to a preset gesture matching the identification result.

3. The earphone control method according to claim 2, wherein in response to the current operation mode being a music playing mode, preset gestures corresponding to the music playing mode comprise: a slide-up gesture, a slide-down gesture, a slide-left gesture and a slide-right gesture, wherein the slide-left gesture is a gesture sliding along a direction a human face is facing in a horizontal direction, the slide-right gesture is a gesture sliding along a direction opposite to the direction the human face is facing in the horizontal direction, the slide-up gesture is a gesture sliding in a vertical direction away from a ground, and the slide-down gesture is a gesture sliding in the vertical direction towards the ground.

4. The earphone control method according to claim 3, wherein an action instruction corresponding to the slide-up gesture is an instruction of playing a previous piece of music, an action instruction corresponding to the slide-down gesture is an instruction of playing a next piece of music, an action instruction corresponding to the slide-left gesture is an instruction of increasing volume, and an action instruction corresponding to the slide-right gesture is an instruction of decreasing volume.

5. The earphone control method according to claim 3, wherein
the preset gestures corresponding to the music playing mode further comprise a slap gesture, and the slap gesture is a gesture vertically approaching the earphone in the horizontal direction; and
the controlling the earphone to perform an action based on an action instruction corresponding to the valid gesture comprises:
obtaining a current operation state of the earphone, and determining an action instruction corresponding to the slap gesture based on the current operation state; and
controlling the earphone to perform the action based on the action instruction.

6. The earphone control method according to claim 5, wherein
in response to the operation state being a music playing state, the action instruction corresponding to the slap gesture is an instruction of pausing playback; and
in response to the operation state being a playback pause state, the action instruction corresponding to the slap gesture is an instruction of resuming playback.

7. The earphone control method according to claim 2, wherein
in response to the current operation mode being a call mode, preset gestures corresponding to the call mode comprise a slap gesture; and
the controlling the earphone to perform an action based on an action instruction corresponding to the valid gesture comprises:
in response to a current operation state of the earphone being a call state, determining that an action instruction corresponding to the slap gesture is an instruction of hanging up based on the call state, and controlling the earphone to end a call based on the instruction of hanging up; and
in response to the current operation state of the earphone being an incoming call state, determining that an action instruction corresponding to the slap gesture is an instruction of answering, and controlling the earphone to enter into a call state based on the instruction of answering.

8. An earphone, comprising an ultrasonic transceiver, an ultrasonic receiver, a memory and a processor, wherein
the ultrasonic transceiver is configured to transmit a first ultrasonic signal and a second ultrasonic signal, and to receive a first echo signal and a second echo signal;
the ultrasonic receiver is configured to receive a third echo signal;
the memory stores a computer program; and
the processor is configured to perform, when executing the computer program, the earphone control method according to claim 1.

9. The earphone according to claim 8, wherein the earphone is a TWS earphone, a secondary microphone arranged on the earphone has ultrasonic reception functions, and the secondary microphone is configured to serve as the ultrasonic receiver.

* * * * *